(12) United States Patent
Akinaga et al.

(10) Patent No.: US 7,495,215 B2
(45) Date of Patent: Feb. 24, 2009

(54) PROBE FOR A SCANNING MAGNETIC FORCE MICROSCOPE, METHOD FOR PRODUCING THE SAME, AND METHOD FOR FORMING FERROMAGNETIC ALLOY FILM ON CARBON NANOTUBES

(75) Inventors: Hiroyuki Akinaga, Tsukuba (JP); Yasuyuki Semba, Tsukuba (JP); Hiroshi Yokoyama, Tsukuba (JP); Masatoshi Yasutake, Chiba (JP); Hiromi Kuramochi, Chiba (JP)

(73) Assignees: National Institute of Advanced Industrial Science and Technology, Chiyoda-ku (JP); SII Nanotechnology Inc., Mihama-ku (JP)

( * ) Notice: Subject to any disclaimer, the term of this patent is extended or adjusted under 35 U.S.C. 154(b) by 354 days.

(21) Appl. No.: 11/322,180

(22) Filed: Dec. 28, 2005

(65) Prior Publication Data

US 2008/0166560 A1    Jul. 10, 2008

(30) Foreign Application Priority Data

Dec. 28, 2004    (JP)    ............................. 2004-378606

(51) Int. Cl.
G01N 23/00    (2006.01)
(52) U.S. Cl. ...................... 250/306; 250/307; 977/842; 977/840
(58) Field of Classification Search ...... 250/306–443.1; 977/840–901
See application file for complete search history.

(56) References Cited

U.S. PATENT DOCUMENTS 6,020,747 A *    2/2000    Bahns et al. ................. 324/754

(Continued)

FOREIGN PATENT DOCUMENTS

JP    2003-240700    8/2003

OTHER PUBLICATIONS

Chikazumi, S., *Physics of Ferromagnetism*, 2nd Ed., Oxford Univ. Press, 1997, Ch. 22, Engineering Applications of Magnetic Materials, pp. 600-604.

(Continued)

*Primary Examiner*—Jack I. Berman
*Assistant Examiner*—Andrew Smyth
(74) *Attorney, Agent, or Firm*—Seed IP Law Group PLLC (57) ABSTRACT

The present invention provides a probe for a scanning magnetic force microscope having a resolution sufficient to allow observation of a magnetic storage medium with 1200 kFCI or higher recording densities, a method for producing the probe, and a method for forming a ferromagnetic alloy film on a carbon nanotube. In the context of the present invention, the probe for a scanning magnetic force microscope comprises a carbon nanotube whose surface is at least in part coated with a ferromagnetic alloy film consisting of any one of a Co—Fe alloy and a Co—Ni alloy, wherein the arithmetic mean roughness (Ra 10 μm) of the surface of the ferromagnetic alloy film is controlled to 1.15 nm or less. A method for producing such probes for a scanning magnetic force microscope and a method for forming such a ferromagnetic alloy film on a carbon nanotube, so as to achieve such mean surface roughness by controlling the growth rate of the ferromagnetic alloy film within the range of 1.0 to 2.5 nm/min, is also disclosed.

15 Claims, 6 Drawing Sheets

U.S. PATENT DOCUMENTS

| | | | |
|---|---|---|---|
| 6,362,011 B1* | 3/2002 | Massey et al. | 436/526 |
| 6,787,769 B2* | 9/2004 | Harada et al. | 250/306 |
| 2003/0001091 A1* | 1/2003 | Nakayama et al. | 250/306 |
| 2004/0113621 A1* | 6/2004 | Naughton | 324/321 |
| 2005/0249980 A1* | 11/2005 | Itoh et al. | 428/828 |
| 2006/0150720 A1* | 7/2006 | Nakayama et al. | 73/105 |
| 2007/0235340 A1* | 10/2007 | Naughton | 204/667 |

OTHER PUBLICATIONS

Kuramochi, H., et al., A Magnetic Force Microscope Using CoFe-Coated Carbon Nanotube Probes, *Nanotechnology*, 16:24-27, 2005.

Manago, T., et al., "Magnetic Force Microscope Using Carbon Nanotube Probes," *Extended Abstracts of the 2004 International Conference on Solid State Devices and Materials*, Sep. 15-17, 2004, Tokyo, pp. 638-639.

Nishijima, H., et al., "Carbon-nanotube Tips for Scanning Probe Microscopy: Preparation by a Controlled Process and Observation of Deoxyribonucleic Acid," *Applied Physics Letters*, 74(26):4061-4063, 1999.

* cited by examiner

PROBE FOR A SCANNING MAGNETIC FORCE MICROSCOPE, METHOD FOR PRODUCING THE SAME, AND METHOD FOR FORMING FERROMAGNETIC ALLOY FILM ON CARBON NANOTUBES

FIELD OF THE INVENTION

The present invention relates to a probe for a scanning magnetic force microscope and a method for producing the probe. In particular, it relates to a probe for a high resolution scanning magnetic force microscope to evaluate magnetic storage media on which data has been magnetically recorded at ultra-high density (for example, 1200 kFCI) and a method for producing the probe.

The present invention also relates to a method for forming ferromagnetic alloy film on carbon nanotubes.

BACKGROUND OF THE INVENTION

Due to advances in research and development for magnetic storage media represented by recent magnetic hard disks, magnetic storage media with an array of nanomagnets having a thickness of 25 nm or less will soon be available. However, analysis tools for practically evaluating such media are still under investigation. Accordingly, it is currently difficult to achieve thorough evaluation.

Indeed, even in the prior art, while various magnetic properties can be evaluated by using scanning electron microscopy or tunneling microscopy that uses spin-polarized electrons, observations with these analytical devices cannot be achieved unless the sample surface is extremely clean. In particular, one must process the surface in an ultra-high vacuum device and prepare a detection device for special electric signals. Thus, these analytical devices have not been widely used in the research and development of magnetic recording.

Meanwhile, the magnetic force microscope (MFM) is known as one of the scanning probe microscopes that measure shapes and physical properties of micro areas through the detection of various physical quantities between the probe and a sample. The scanning magnetic force microscope detects magnetic forces between the probe and the sample (typically, a ferromagnetic body). The detection principle is based on the magnetic field leakage from the sample, and, thus, quantitative evaluation of the magnetic properties of the sample is difficult. However, due to its insensitivity to the condition of the sample surface, the microscope has great practical advantage in that it requires neither a specific environment nor specific processing of the sample surface to perform observation.

Due to such characteristic features of the scanning magnetic force microscope, there has been an expectation that the microscope would be applicable to the research and development of magnetic media. However, the resolution achieved by commercially available devices generally ranges only about 50 to 100 nm, and even current state-of-art devices have achieved only a resolution of about 20 to 30 nm. Thus, it is currently difficult to evaluate magnetic storage media in the research and development of next generation hard disk, nonvolatile random-access memory, and the like.

To improve the resolution of the scanning probe microscope, it has been suggested that the probe tip be acuminated. Conventional techniques known for preparing such probe tips that can be used for testing magnetic properties include: (1) forming a cylindrical process of tungsten or diamond-like carbon (DLC) using focused ion beam (FIB) on the platform shaped as a base; and (2) attaching a carbon nanotube onto the platform shaped as a base and coated it along its bottom circumference using focused ion beam (see, for example, Japanese Patent Application Kokai Publication No. (JP-A) 2003-240700 (unexamined, published Japanese patent application)).

Alternatively, there exists a technology established by the present inventors, which achieves high resolution applicable to 1100-kFCI media by employing a cantilever for a magnetic force microscope (MFM) that comprises a carbon nanotube (a diameter up to about 11 nm) isotropically coated with a ferromagnetic CoFe thin film using spattering device (the diameter of the coated carbon nanotube tip is about 40 nm) (see, for example, Manago, T. et al., Extended Abstracts of the 2004 International Conference on Solid State Devices and Materials, pp. 638-639 (Sep. 15, 2004); and Kuramochi H et al., *Nanotechnology*, Vol. 16, pp. 24-27 (2005)).

SUMMARY OF THE INVENTION

An attempt to use a multi-walled carbon nanotube (CNT) as a probe for an atomic force microscope (AFM) is described in JP-A 2003-240700. However, due to its low rigidity even when attached to a cantilever tip of an AFM, such CNTs have been shown to be inadequate for the measurement of samples with irregular surfaces. Thus, it has been considered to be difficult to use a carbon nanotube as a probe for the scanning magnetic force microscope.

Furthermore, JP-A 2003-240700 describes that by preparing the probe tip with magnetic material, the probe can be used to test the magnetic properties of a sample. However, these conventional probes are generally entirely coated. As a result, they are affected by the information of a wide surface of the sample and, therefore, fail to obtain local information on the probe tip. In addition, as discussed in JP-A 2003-240700, the coatings on these conventional probes readily peel off.

Meanwhile, prior to this application, the present inventors succeeded in coating a carbon nanotube with CoFe, a process which previously had been thought to be difficult. Furthermore, they also succeeded in applying it as a probe for a scanning magnetic force microscope (see Manago T. et al., supra).

However, the observation of 1100 kFCI perpendicular magnetic storage media was the limit of the probe disclosed in Manago T. et al., supra. Thus, at best, the probe allows for observation of media with highest recording density available at present, and is predicted to be incapable of observing media with much improved recording density.

In addition, as pointed out in JP-A 2003-240700, none of the previous publications solved the problem of the coating of the carbon nanotube readily peeling off. Moreover, it has been noted that the carbon nanotube of some probes becomes unsheathed from the cover layer CoFe. Such unsheathing constitutes an obstacle to practical use.

As described above, to solve the technical problems of the prior art, the present inventors searched for a stable probe for the scanning magnetic force microscope with improved resolution, without the peeling off of the ferromagnetic alloy film, and a method for producing the probe.

First, the inventors examined ferromagnetic materials for coating. As described in JP-A 2003-240700, to avoid being influenced by the information from a wide sample surface, it is desirable that the probe tip be only locally coated. However, considering the available processing technology available today, it was predicted that it would be extremely difficult to coat only the tip of the carbon nanotube.

Thus, the present inventors planned to coat the whole probe, including the carbon nanotube, according to conventional methods, but intended to select a more beneficial coating material.

As described above, perpendicular magnetization-type magnetic materials, for example, magnetic material represented by the Co—Cr alloy and the amorphous rare-earth-Fe alloy, were considered to be most suitable when coating only the tip of the carbon nanotube. However, when coating the whole probe, the present inventors conceived that the Fe—Co or Fe—Ni alloys, which are inner magnetization type magnetic materials, may be superior to achieve excellent magnetic field directivity of the probe tip by suppressing the leakage of magnetic field from the probe, in particular from the lateral surface of the carbon nanotube.

Then, assuming that such coating materials are selected, the inventors examined factors influencing the resolution. As a result, the inventors determined that it was important to minimize the magnetic field leakage from the lateral surface of the carbon nanotube. To achieve this, the inventors controlled the smoothness of a coating material on the lateral surface of the carbon nanotube.

From the viewpoint of processing efficiency, it is preferred to uniformly coat the whole surface of the probe tip, including the base, with ferromagnetic alloy. However, this gives rise to the risk of unsheathing of the ferromagnetic alloy film. Thus, an embodiment where only the tip of the carbon nanotube is coated with the ferromagnetic alloy is also encompassed by the present invention.

However, even in that case, to suppress the leakage of magnetic field from the lateral surface of the carbon nanotube and to improve the directivity of magnetic field of the probe tip as described above, it is preferred that the coated portion has an external shape longer in the longitudinal direction than in the direction of diameter.

Finally, the present inventors successfully discovered a particular correlation between surface roughness of the coating film and resolution of the probe. The inventors also discovered that a surface roughness of the coating film that provides better resolution could be achieved by controlling the speed of film formation, such as by sputtering.

Common sense predicts that the surface roughness would be more improved as the speed of film formation was slower. However, as shown in the experimental results described below, it was observed that, as the speed of film formation became too slow, the surface roughness became rather greater, thereby reducing the resolution of the probe.

The present invention was achieved as a result of considerations described above, and solves technical problems in the above-described prior art technologies. Accordingly, it is an object of the present invention to provide:

[1] a probe for a scanning magnetic force microscope comprising a carbon nanotube in which at least a portion of the surface of said nanotube is coated with a ferromagnetic alloy film selected from the group consisting of an Fe—Co alloy and an Fe—Ni alloy, further wherein the surface roughness (Ra(L=10 μm)) of said ferromagnetic alloy film is 1.15 nm or less;

[2] the probe for a scanning magnetic force microscope according to [1], wherein the ferromagnetic alloy film comprises 10 to 70 wt % of Fe, less than 10 wt % of improving additives, and a remainder comprising Co and inevitable impurities;

[3] the probe for a scanning magnetic force microscope according to [1], wherein the ferromagnetic alloy film comprises 10 to 55 wt % of Fe, less than 10 wt % of improving additives, and a remainder comprising Ni and inevitable impurities;

[4] the probe for a scanning magnetic force microscope according to [1], wherein the mean thickness of the ferromagnetic alloy film in the coated portion is 3 to 15 nm;

[5] the probe for a scanning magnetic force microscope according to [1], wherein the carbon nanotube is coated with the ferromagnetic alloy film from a tip thereof over a length equal to or longer than the sum of the mean diameter of the carbon nanotube and twice the length as the mean thickness of the ferromagnetic alloy film;

[6] the probe for a scanning magnetic force microscope according to [1], further comprising a base having a cusp to which the carbon nanotube coated with the ferromagnetic alloy film is attached;

[7] a method for producing probes for a scanning magnetic force microscope comprising the steps of: attaching a carbon nanotube to a cusp of a base which can be mounted onto a cantilever tip; coating the base to which the carbon nanotube is attached via plasma from a sputtering target, said coating comprising a ferromagnetic alloy selected from the group consisting of an Fe—Co alloy and an Fe—Ni alloy; and controlling the plasma so that the growth rate of the ferromagnetic alloy film on the cusp surface of the base to which the carbon nanotube is attached falls within the range of 1.0 to 2.5 nm/min;

[8] the method for producing probes for a scanning magnetic force microscope according to [7], wherein the sputtering target comprises 10 to 70 wt % of Fe, less than 10 wt % of improving additives, and a remainder comprising Co and inevitable impurities;

[9] the method for producing probes for a scanning magnetic force microscope according to [7], wherein the sputtering target comprises 10 to 55 wt % of Fe, less than 10 wt % of improving additives, and a remainder comprising Ni and inevitable impurities;

[10] the method for producing probes for a scanning magnetic force microscope according to [7], further comprising the step of terminating the exposure to the plasma when the thickness of the ferromagnetic alloy film falls within the range of 3 to 15 nm;

[11] the method for producing a probe for a scanning magnetic force microscope according to [7], wherein the carbon nanotube is coated with the ferromagnetic alloy film from a tip thereof over a length equal to or longer than the sum of the mean diameter of the carbon nanotube and twice the length of the mean thickness of the ferromagnetic alloy film;

[12] a method for forming a ferromagnetic alloy film on a carbon nanotube comprising the steps of: exposing to plasma a carbon nanotube together with a sputtering target comprising a ferromagnetic alloy selected from the group consisting of an Fe—Co alloy and an Fe—Ni alloy; and controlling the plasma so that the growth rate of the ferromagnetic alloy film on the carbon nanotube surface falls within the range of 1.0 to 2.5 nm/min;

[13] the method for forming a ferromagnetic alloy film on a carbon nanotube according to [12], wherein the sputtering target comprises 10 to 70 wt % of Fe, less than 10 wt % of improving additives, and a remainder comprising Co and inevitable impurities;

[14] the method for forming a ferromagnetic alloy film on a carbon nanotube according to [12], wherein the sputtering target comprises 10 to 55 wt % of Fe, less than 10 wt % of improving additives, and a remainder comprising Ni and inevitable impurities; and

[15] the method for forming a ferromagnetic alloy film on a carbon nanotube according to [12], further comprising the step of terminating the exposure to the plasma when the thickness of the ferromagnetic alloy film becomes falls the range of 3 to 15 nm.

In the context of the present invention, the following definitions apply:

As used herein, the phrase "surface roughness" refers to so-called "arithmetic mean roughness (Ra)", which is the arithmetic mean of the absolute values of distances from the mean line to the roughness profile over a randomly-selected evaluation length (L=10 μm) on the flat surface of the base attached to the carbon nanotube.

It is difficult to conveniently measure the surface roughness of the lateral surface of the carbon nanotube. Accordingly, herein the surface roughness was determined using the flat surface of the base. The present inventors believe that the surface roughness of the lateral surface can be sufficiently defined based on the surface roughness of the flat portion of base where the film was formed under the same condition.

Meanwhile, although the preferred thickness for the ferromagnetic alloy film is about 10 nm, any film thickness can be used, so long as falls within the range of 3 to 15 nm. From the viewpoint of resolution and reliable preparation, the length of the carbon nanotube protruding from the cusp of base is described in the Examples below as preferably being about 400 nm. However, the present invention is not limited to such lengths. Rather, any carbon nanotube can be practically used in the context of the present invention so long as its length falls within the range of about 100 to 500 nm.

Furthermore, as described above, any inner surface magnetization ferromagnetic material, including, but not limited to, Fe—Co and Fe—Ni alloys, can be used for the ferromagnetic alloy film of the present invention. An exemplary alloy composition is as follows: 10 to 70 wt % of Fe, with less than 10 wt % improving additives that do not markedly interfere the ferromagnetic properties (e.g., in the case of an Fe—Co alloy, the alloy may contain one or more materials selected from Ni, V, Mo, W, Ti, Si, and B; alternatively, in the case of an Fe—Ni alloy, the alloy may contain one or more materials selected from Mo, Cr, Cu, and Nb), and with Co, Ni, or Co—Ni (and inevitable impurities) making up the remainder.

In an Fe—Co alloy, the highest magnetic susceptibility is obtained when the Fe content is about 60 wt %. While a material comprising 50 to [200/3] wt % Fe is generally used, in the context of the present invention, materials comprising 10 to 70 wt % Fe can also be used. Alternatively, depending on the purpose, an Fe—Ni alloy comprising 20 to 50 wt % Fe has been used. However, in the context of the present invention, the alloy preferably comprises 10 to 55 wt % Fe. Conventionally used (flexible) magnetic materials and their properties are described in, for example, C. D. Graham, Jr., "Physics of Ferromagnetism (Second Edition)" pp. 600-604 (Oxford University Press).

These and other objects and features of the invention will become more fully apparent when the following detailed description is read in conjunction with the accompanying figures and examples.

EXPLANATION OF REFERENCED NUMERALS

1: Probe for magnetic force microscope (probe tip)
2: Carbon nanotube
3: Cusp of base
4: Ferromagnetic alloy film
5: Sample (magnetic storage medium)
→ Direction of magnetization of the nanoscopic bar magnet in the sample (magnetic storage medium)

DETAILED DESCRIPTION OF THE INVENTION

The words "a", "an", and "the" as used herein mean "at least one" unless otherwise specifically indicated.

Figure 1:
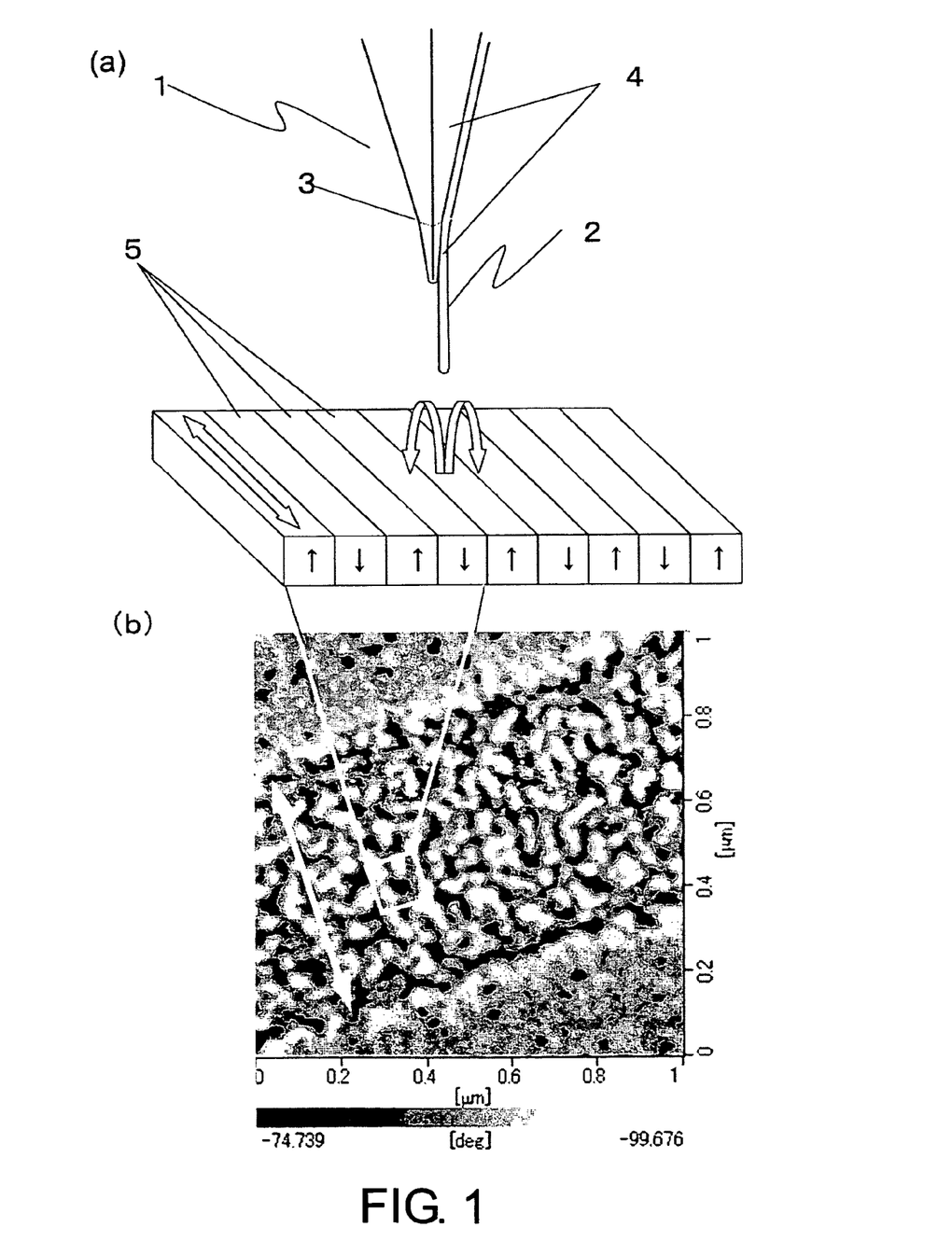
FIG. 1 is a schematic illustration depicting the measuring principle of a scanning magnetic force microscope.

FIG. 1 is a schematic illustration of the measuring principle for a scanning magnetic force microscope of the present invention. Carbon nanotube (2) is attached to the cusp of base (3) of a magnetic force microscope probe (1). Coating film (4), consisting of ferromagnetic alloy, is formed on the surface of the carbon nanotube (2) and the cusp of base (3). The above-described coating film (4) interacts with the magnetic field that leaks from the surface of the sample (e.g., a magnetic storage medium) (5) having the structure of arranged nanomagnet rods, resulting in an attractive force to or a repulsive force against the sample surface. The resulting very subtle change of moment applied to the probe (1) is amplified based on the optical lever principle and detected by a photodetector in the scanning magnetic force microscope.

Figure 2:
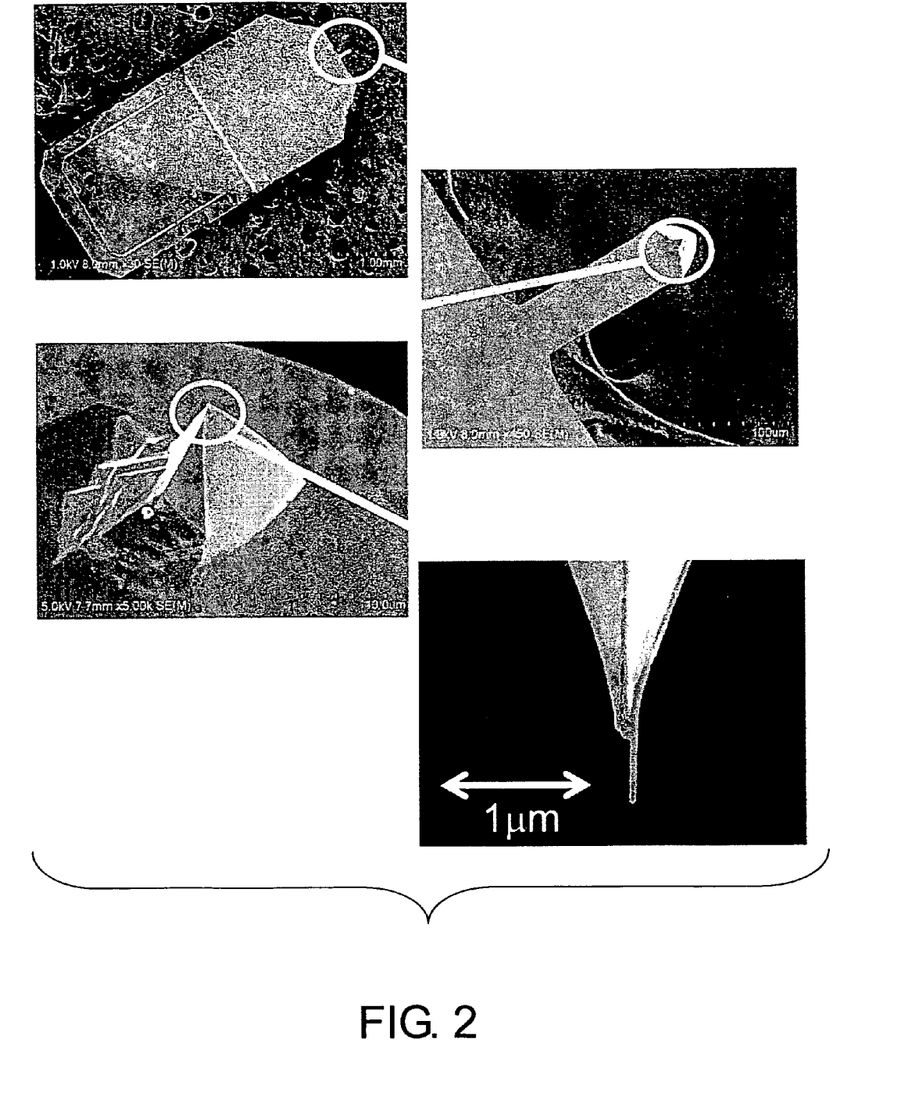
FIG. 2 depicts micrographs of the probe portion of a scanning magnetic force microscope according to the present invention.

FIG. 2 depicts micrographs of the tip of a probe for a scanning magnetic force microscope of the present invention. As shown in FIG. 2, a multi-walled carbon nanotube with a diameter of about 10 nm is immobilized onto the projection of the cantilever tip. The carbon nanotube is attached, protruding at about 400 nm from the cusp of the cantilever tip.

Furthermore, the diameter of the carbon nanotube was found to be about 20 to 40 nm at the end proximal to the sample, which indicates the forming of a ferromagnetic alloy film with a desired thickness of about 10 nm.

The following outlines the procedure of preparing a cantilever according to the present invention. First, conventional direct-current arc-discharge methods are used to prepare the carbon nanotubes. For example, a general direct-current arc-discharge method, wherein multi-walled carbon nanotubes grow from the catalyst as the origin as follows, may be used. In a preferred embodiment, the catalyst is uniformly spread over a platform, made from SiC, for example. By introducing a gaseous material comprising mainly hydrogen gas, together with Ar gas for plasma discharge, and additionally other gases, such as acetylene, ethylene, and methane, onto the platform under predetermined pressure, a direct current arc discharge may be generated.

Next, the carbon nanotubes are ultrasonically dispersed in alcohol. Then, the resulting suspension is centrifuged to remove large particles. The suspension is injected into a gap between knife edges of a pair of razors or such, which have been arranged at a particular distance. High frequency voltage is applied between the knife edges to align the carbon nanotubes on the knife edges. After removing alcohol, for example, by evaporation, while direct-current bias voltage is applied between the knife edges and the cusp of base, which can be mounted on the cantilever, the cusp is allowed to approach the knife edges under observation with an SEM to attach a carbon nanotube to the cusp of base by electrostatic attraction (for details on the installation of carbon nanotubes, see, for example, Nishijima H. et al., Applied Physics Letters Vol. 74, No. 26 (1999) 4061-4063 (1999)).

Note, the foregoing procedure is intended to be illustrative only. The process of growing carbon nanotubes and attaching them to the cantilever of the present invention is not limited to the procedure described above. Rather, any conventional method may be used for this purpose.

The base, having a carbon nanotube attached to its cusp tip by the procedure described above, is placed together with a ferromagnetic sputtering target into a film-forming device. Electric power is supplied to generate plasma. While the growth rate of ferromagnetic film is controlled by adjusting the input electric power and/or gas pressure, the ferromagnetic film is uniformly formed on the whole surface of the base, including the carbon nanotube.

Finally, the ferromagnetic film-coated base with the carbon nanotube formed by the procedure described above is mounted on the cantilever tip of a conventional scanning magnetic force microscope. Thus, the probe of the present invention can be used as a probe for a scanning magnetic force microscope.

Figure 3:
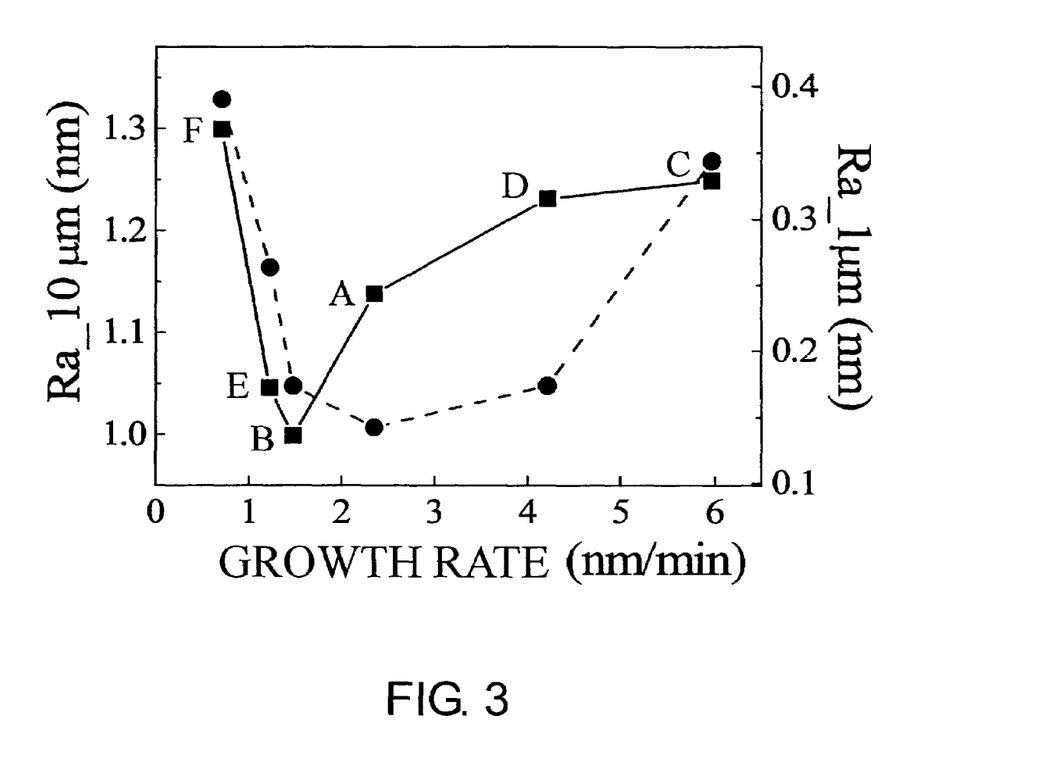
FIG. 3 is a diagram depicting the relationship between growth rate and roughness of a film coating a probe of the present invention. The solid line and the broken line represent the surface roughness measured over 10 μm (Ra(L=10 μm)) and 1 μm (Ra(L=1 μm)), respectively. Points A to F correspond to data obtained under different film formation conditions (A to F), which are identical for the Ra(L=10 μm) and the Ra(L=1 μm) measurements.

FIG. 3 provides a summary of conditions and results of film formation in Examples 1 to 3 and Comparative Examples 1 to 3 described below. FIG. 3 clearly depicts the correlation between the surface roughness (Ra(L=10 μm)) and growth rate of a ferromagnetic film. In addition, comparison between the surface roughness and the resolution of the probe revealed that probes exhibit superior performance in the cases of film formation conditions A, B and E.

The results obtained by the measurement of surface roughness (Ra), wherein the evaluation length (L) was set as 1 μm, is also depicted in FIG. 3. However, the correlation with the growth rate was unsatisfactory. Thus, the surface roughness wherein the evaluation length (L) was set as 10 μm was employed as a parameter to define the probe of the present invention.

Generally, lower growth rates in the deposition tended to lead to low surface roughness, which, in turn, provide improved probe performance. Specifically, preferable results were obtained when the growth rate was set at or below 2.5 nm/min. However, the results did not necessarily become better when the growth rate became lower. For example, when the rate was less than 1.0 nm/min, the surface roughness became rather greater. Thus, it is preferable to maintain the growth rate of the ferromagnetic alloy film within the range of 1.0 to 2.5 nm/min. However, the present invention is not restricted thereto.

Considering the unsheathing phenomenon observed in Comparative Example 3, wherein the film formation condition F with a film forming rate of less than 1.0 nm/min was adopted, the inventors deduced that this lower limit of the growth rate is attributed to adhesion of the ferromagnetic alloy film and the multi-walled carbon nanotube with metallic properties. It appears that the carbon nanotube seems failed to retain the deposits at such a too low growth rate.

In the following Examples and Comparative Examples, sputtering deposition was carried out without rotating the platform on which the samples were placed. However, this does not mean that the present invention is restricted to this aspect. For example, the platform may be rotated to improve deposition uniformity in the circumferential direction of the carbon nanotube.

Although methods and materials similar or equivalent to those described herein can be used in the practice or testing of the present invention, suitable methods and materials are described below. However, the following examples are only intended to illustrate the present invention and to assist one of ordinary skill in making and using the same. Accordingly, the examples are not intended in any way to otherwise limit the scope of the invention.

EXAMPLES

Example 1

A multi-walled carbon nanotube with a diameter of about 10 nm was attached onto a base, and this sample was placed into a sputtering device in which Fe—Co (Fe: 20 at % and Co: 80 at %) sputtering target had been mounted. After Ar gas was introduced at 10 sccm and the gaseous pressure was adjusted to 0.3 Pa, 100 W of radio frequency electric power (RF) was applied to generate plasma. Under this condition (hereinafter referred to as "film formation condition A"), the film-forming treatment was carried out for 4 min and 15 sec.

Figure 4:
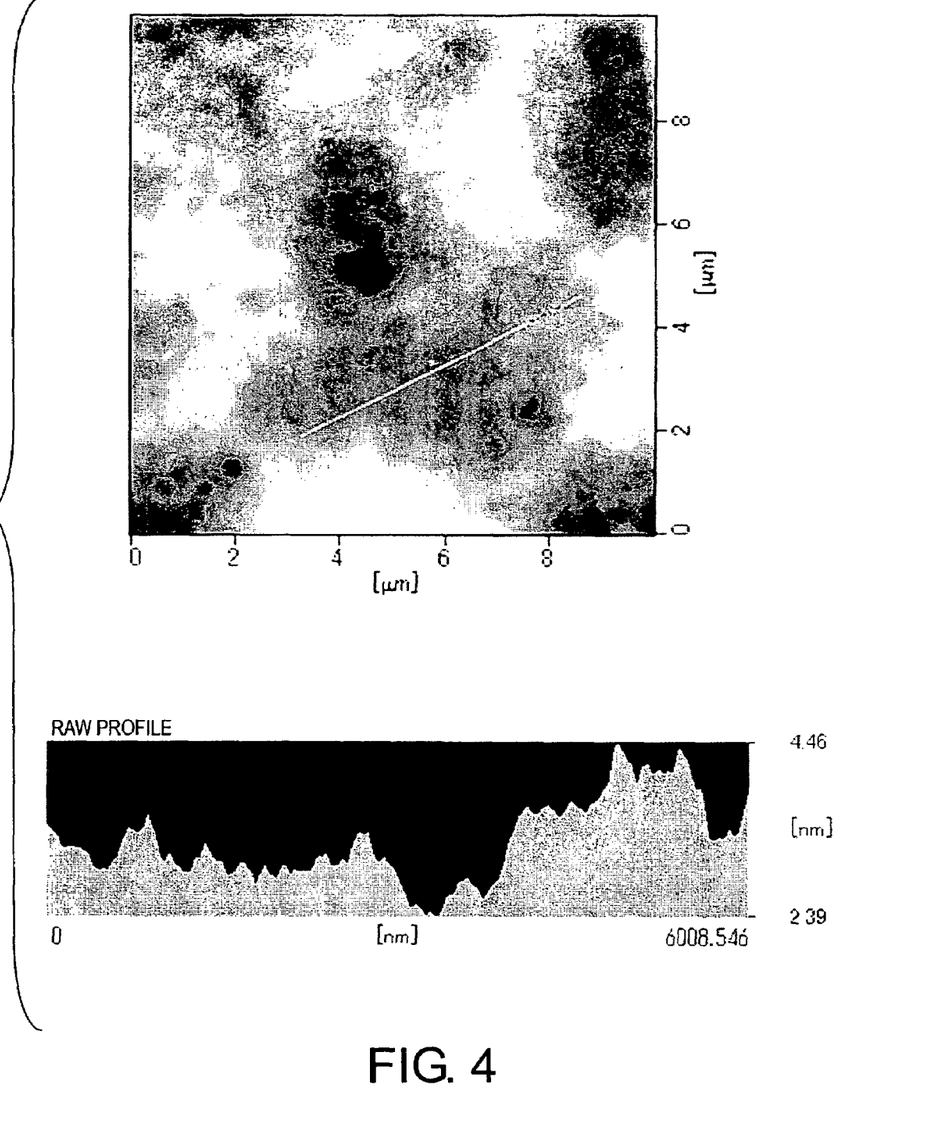
FIG. 4 depicts an exemplary profile of the surface roughness of a film coating a probe according to the present invention.

The results demonstrated that the Fe—Co ferromagnetic alloy film of the sample had a thickness of 10 nm, as determined from its electron microscopic images. Thus, the mean growth rate of ferromagnetic alloy film was found to be 2.35 nm/min under this condition. The surface roughness of the sample prepared as above was determined at flat portions of the base tip using atomic force microscope. The obtained roughness profile is shown in FIG. 4. The arithmetic mean value for the surface roughness Ra(L=10 μm) was 1.138 (for comparison, Ra(L=1 μm) was 0.1425).

Figure 5:
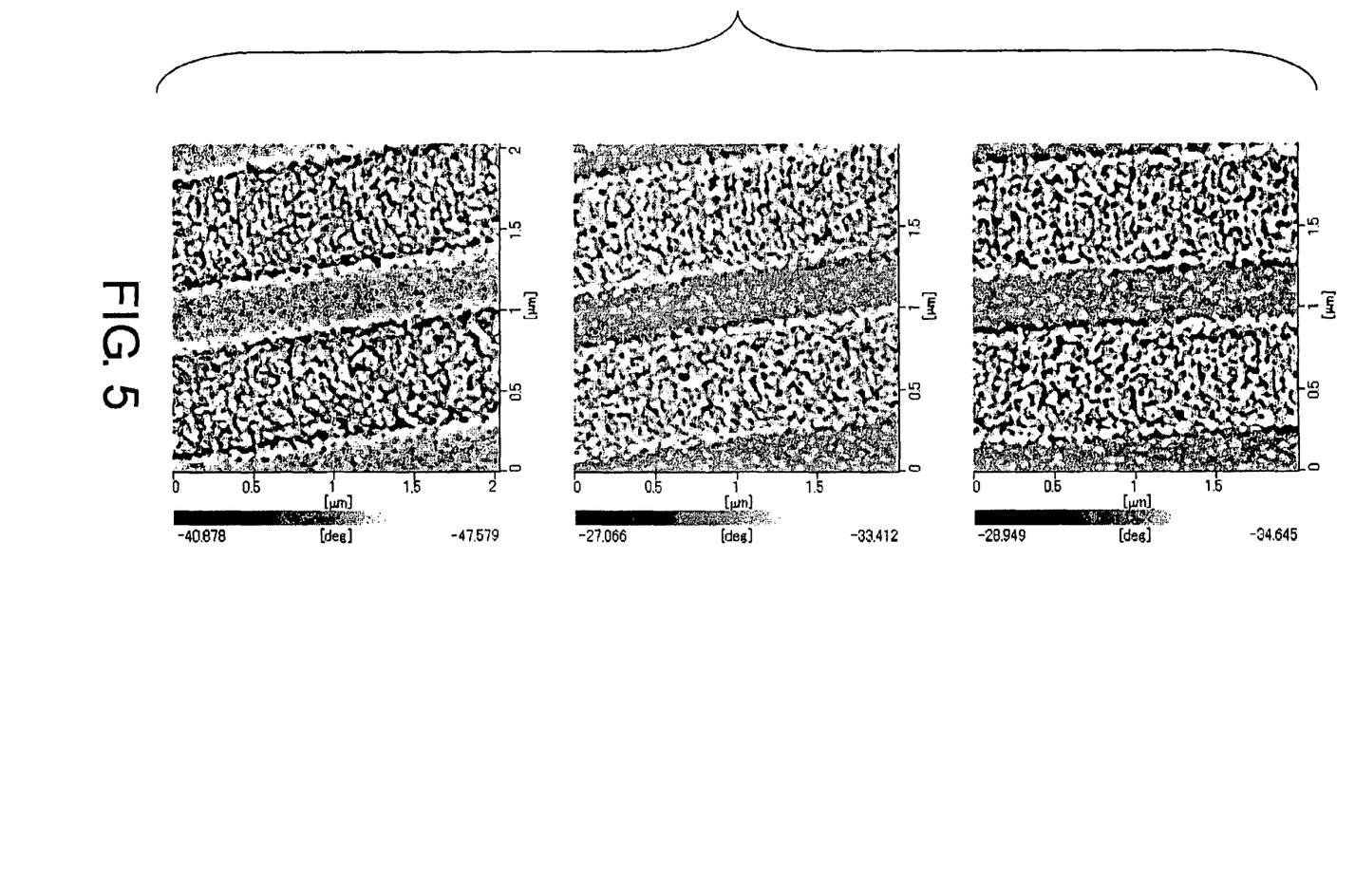
FIG. 5 depicts magnetic force micrographs of the surface of a 1200-kFCI magnetic storage medium obtained with a probe for a scanning magnetic force microscope according to the present invention.

In addition, this base sample was mounted onto a cantilever of a scanning magnetic force microscope, and used to observe magnetic storage media with densities from 600 to 1200 kFCI manufactured by Fujitsu. As shown in FIG. 5, clear micrographic images could be also obtained for a 1200-kFCI magnetic storage medium. Thus, the cantilever resolution was estimated to be about 10 nm (maximum of about 7 nm).

Figure 6:
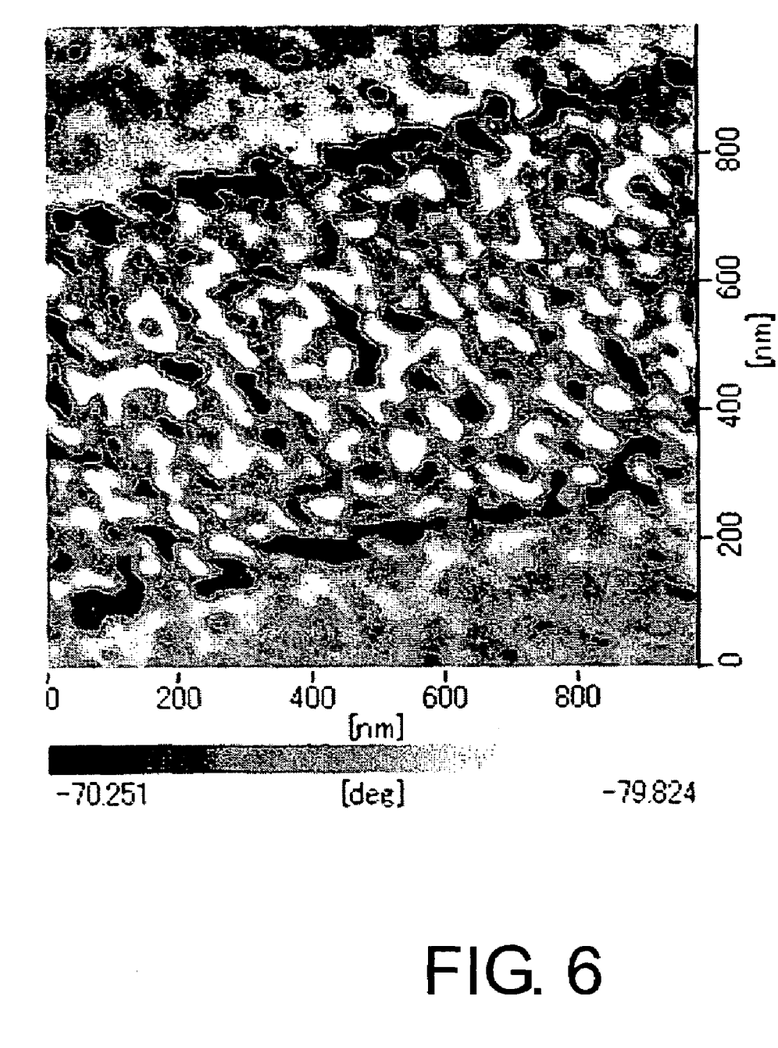
FIG. 6 is a scanning magnetic force micrograph of the surface of a 1200-kFCI magnetic storage medium obtained with a three-days-used probe for a scanning magnetic force microscope according to the present invention.

Further, FIG. 6 depicts a pattern of the surface of the 1200-kFCI magnetic storage medium observed using a cantilever that had been used for three days. A clear micrographic image that stands comparison with those shown in FIG. 5 could be obtained. Therefore, it was suggested that there was no development of defect, such as release of and unsheathing of the ferromagnetic alloy film. Thus, it was confirmed that the probe had sufficient strength to allow practical and repeated use.

Example 2

A sample base was prepared through a similar film-forming treatment as described in Example 1, with the exception that the pressure was changed from 0.3 Pa to 1 Pa (hereinafter referred to as "film formation condition B").

As a result, the growth rate decreased to 1.48 nm/min, and the surface roughness Ra(L=10 μm) of the formed ferromagnetic film was improved to 0.9996 nm (for comparison, Ra(L=1 μm) was 0.1739 nm). As with the case of Example 1, clear micrographic images could be also obtained for the 1200-kFCI magnetic storage medium.

Example 3

A sample base was prepared through a similar film-forming treatment as described in Example 1, with the exception that the input radio frequency electric power was reduced from 100 W to 50 W (hereinafter referred to as "film formation condition E").

As a result, the growth rate decreased to 1.23 nm/min, and the surface roughness Ra(L=10 μm) of the formed ferromagnetic film was improved to 1.046 nm (for comparison, Ra(L=1 μm) was 0.2636 nm). As with the case of Example 1, clear micrographic images could be also obtained for the 1200-kFCI magnetic storage medium.

Comparative Example 1

A sample base was prepared through a similar film-forming treatment as described in Example 1, with the exception that the input radio frequency electric power was increased from 100 W to 300 W (hereinafter referred to as "film formation condition C").

As a result, the growth rate increased to 5.97 nm/min, and the surface roughness Ra(L=10 μm) of the formed ferromagnetic film decreased to 1.249 nm (for comparison, Ra(L=1 μm) was 0.344 nm). The measurable limit for the magnetic storage media was 600 kFCI, and no clear images could be obtained for media with higher recording densities.

Comparative Example 2

A sample base was prepared through a similar film-forming treatment as described in Example 1, with the exception that the input radio frequency electric power was increased from 100 W to 300 W and the pressure was increased from 0.3 Pa to 1 Pa (hereinafter referred to as "film formation condition D").

As a result, the growth rate slightly increased to 4.21 nm/min, and the surface roughness Ra(L=10 μm) of the formed ferromagnetic film decreased to 1.231 nm (for comparison, Ra(L=1 μm) was 0.142 nm). The measurable limit for the magnetic storage media was 800 kFCI, and no clear images could be obtained for media with higher recording densities. In addition, most carbon nanotubes became shortened or bent.

Comparative Example 3

A sample base was prepared through a similar film forming treatment as described in Example 1, with the exception that the input radio frequency electric power was reduced from 100 W to 50 W and the pressure was increased from 0.3 Pa to 1 Pa (hereinafter referred to as "film formation condition F").

As a result, the growth rate decreased to 0.71 nm/min; however, the surface roughness Ra(10 μm) of the formed ferromagnetic alloy film decreased to 1.299 nm (for comparison, Ra(L=1 μm) was 0.3905 nm).

The measurable limit for the magnetic storage media was 1000 kFCI, and no clear images could be obtained for media with higher recording densities. In addition, most carbon nanotubes became shortened or the ferromagnetic alloy film unsheathed from the probe, and thus failed to form a uniform film up to the base.

INDUSTRIAL APPLICABILITY

The present inventors have solved some of the technical problems of the prior art by providing a stable probe for the scanning magnetic force microscope having improved resolution and an improved coating character (i.e., coated with a ferromagnetic alloy film resistant to the prior art problem of peeling). Specifically, by controlling the surface roughness of the ferromagnetic film coating the carbon nanotube forming the probe for a scanning magnetic force microscope, the present invention achieves a resolution that allows observation of 1200-kFCI magnetic storage media. In addition, the present invention shows that the surface roughness can be controlled by controlling the growth rate of the coating ferromagnetic alloy. Thus, even when the expected magnetic storage media with a higher density are provided in the future, its magnetization state or the like can be simply evaluated without using devices such as spin-polarized electron tunneling microscope and scanning electron microscope.

In addition, the present invention allows uniform and stable deposition of Fe—Co or Fe—Ni ferromagnetic alloys on the carbon nanotube surface. Therefore, the present invention enables the conference of various characteristics by metal coating to not only probes for a scanning magnetic force microscope but also to other carbon nanotubes, and thus expands the utility of carbon nanotubes.

While the invention has been described in detail and with reference to specific embodiments thereof, it will be apparent to one skilled in the art that various changes and modifications can be made therein without departing from the spirit and scope of the invention.

All patents, published patent applications, and publications cited herein are hereby incorporated by reference in their entirety.

What is claimed is:

1. A probe for a scanning magnetic force microscope comprising a carbon nanotube in which at least a portion of the surface of said nanotube is coated with a ferromagnetic alloy film selected from the group consisting of an Fe—Co alloy and an Fe—Ni alloy, further wherein the surface roughness (Ra(L=10 μm)) of said ferromagnetic alloy film is 1.15 nm or less.

2. The probe for a scanning magnetic force microscope according to claim 1, wherein the ferromagnetic alloy film comprises 10 to 70 wt % of Fe, less than 10 wt % of improving additives, and a remainder comprising Co and inevitable impurities.

3. The probe for a scanning magnetic force microscope according to claim 1, wherein the ferromagnetic alloy film comprises 10 to 55 wt % of Fe, less than 10 wt % of improving additives, and a remainder comprising Ni and inevitable impurities.

4. The probe for a scanning magnetic force microscope according to claim 1, wherein the mean thickness of the ferromagnetic alloy film in the coated portion is 3 to 15 mm.

5. The probe for a scanning magnetic force microscope according to claim 1, wherein the carbon nanotube is coated with the ferromagnetic alloy film from a tip thereof over a length equal to or longer than the sum of the mean diameter of the carbon nanotube and twice the length as the mean thickness of the ferromagnetic alloy film.

6. The probe for a scanning magnetic force microscope according to claim 1, further comprising a base having a cusp to which the carbon nanotube coated with the ferromagnetic alloy film is attached.

7. A method for producing probes for a scanning magnetic force microscope comprising the steps of: attaching a carbon nanotube to a cusp of a base which can be mounted onto a cantilever tip; coating the base to which the carbon nanotube is attached via plasma from a sputtering target, said coating comprising a ferromagnetic alloy selected from the group consisting of an Fe—Co alloy and an Fe—Ni alloy; and controlling the plasma so that the growth rate of the ferromagnetic alloy film on the cusp surface of the base to which the carbon nanotube is attached falls within the range of 1.0 to 2.5 nm/min.

8. The method for producing probes for a scanning magnetic force microscope according to claim 7, wherein the sputtering target comprises 10 to 70 wt % of Fe, less than 10 wt % of improving additives, and a remainder comprising Co and inevitable impurities.

9. The method for producing probes for a scanning magnetic force microscope according to claim 7, wherein the sputtering target comprises 10 to 55 wt % of Fe, less than 10 wt % of improving additives, and a remainder comprising Ni and inevitable impurities.

10. The method for producing probes for a scanning magnetic force microscope according to claim 7, further comprising the step of terminating the exposure to the plasma when the thickness of the ferromagnetic alloy film falls within the range of 3 to 15 nm.

11. The method for producing a probe for a scanning magnetic force microscope according to claim 7, wherein the carbon nanotube is coated with the ferromagnetic alloy film from a tip thereof over a length equal to or longer than the sum of the mean diameter of the carbon nanotube and twice the length of the mean thickness of the ferromagnetic alloy film.

12. A method for forming a ferromagnetic alloy film on a carbon nanotube comprising the steps of: exposing to plasma a carbon nanotube together with a sputtering target comprising a ferromagnetic alloy selected from the group consisting of an Fe—Co alloy and an Fe—Ni alloy; and controlling the plasma so that the growth rate of the ferromagnetic alloy film on the carbon nanotube surface falls within the range of 1.0 to 2.5 nm/min.

13. The method for forming a ferromagnetic alloy film on a carbon nanotube according to claim 12, wherein the sputtering target comprises 10 to 70 wt % of Fe, less than 10 wt % of improving additives, and a remainder comprising Co and inevitable impurities.

14. The method for forming a ferromagnetic alloy film on a carbon nanotube according to claim 12, wherein the sputtering target comprises 10 to 55 wt % of Fe, less than 10 wt % of improving additives, and a remainder comprising Ni and inevitable impurities.

15. The method for forming a ferromagnetic alloy film on a carbon nanotube according to claim 12, further comprising the step of terminating the exposure to the plasma when the thickness of the ferromagnetic alloy film becomes falls the range of 3 to 15 nm.

* * * * *